(12) United States Patent
Catchings, Sr. et al.

(10) Patent No.: US 9,879,151 B2
(45) Date of Patent: Jan. 30, 2018

(54) F-POSS COATINGS AND ADDITIVES AND METHODS OF MAKING SAME

(71) Applicant: NBD NANOTECHNOLOGIES, INC., Boston, MA (US)

(72) Inventors: Perry L. Catchings, Sr., Roxbury, MA (US); Bong June Zhang, Chestnut Hill, MA (US)

(73) Assignee: NBD NANOTECHNOLOGIES, INC., Danvers, MA (US)

( * ) Notice: Subject to any disclaimer, the term of this patent is extended or adjusted under 35 U.S.C. 154(b) by 117 days.

(21) Appl. No.: 14/864,014

(22) Filed: Sep. 24, 2015

(65) Prior Publication Data

US 2016/0083612 A1 Mar. 24, 2016

Related U.S. Application Data

(60) Provisional application No. 62/054,736, filed on Sep. 24, 2014.

(51) Int. Cl.
| | | |
|---|---|---|
| *C09D 133/14* | (2006.01) | |
| *C09D 133/12* | (2006.01) | |
| *C09D 133/10* | (2006.01) | |
| *C09D 133/16* | (2006.01) | |
| *C08F 220/14* | (2006.01) | |
| *C08F 220/20* | (2006.01) | |
| *C08F 220/36* | (2006.01) | |
| *C09D 143/04* | (2006.01) | |

(52) U.S. Cl.
CPC .......... *C09D 133/16* (2013.01); *C08F 220/14* (2013.01); *C08F 220/20* (2013.01); *C08F 220/36* (2013.01); *C09D 143/04* (2013.01)

(58) Field of Classification Search
CPC .... C08F 220/14; C08F 220/20; C08F 220/36; C09D 133/16; C09D 143/04
USPC .......................................................... 526/266
See application file for complete search history.

(56) References Cited

U.S. PATENT DOCUMENTS

| | | |
|---|---|---|
| 2006/0052623 A1 | 3/2006 | Yoshida et al. |
| 2013/0072609 A1 | 3/2013 | Haddad et al. |
| 2014/0127617 A1 | 5/2014 | Zhou et al. |

OTHER PUBLICATIONS

Ramirez et al. (Reversible addition-fragmentation chain transfer (RAFT) copolymerization of fluoroalkyl polyhedral oligomeric silsesquioxane (F-POSS) macromers, Polym. Chem., 2013, 4, 2230-2234).*
Yamauchi et al. (Contact Angle of Poly(alkyl methacrylate)s and Effects of the Alkyl Group, Macromolecules 2006, 39, 1156-1159).*
Chhatre et al.; Fluoroalkylated Silicon-Containing Surfaces—Estimation of Solid Surface Energy; ACS Appl. Mater. Interfaces; 2010; pp. 3544-3554; vol. 2.
Mabry et al.; Fluorinated Polyhedral Oligomeric Silsesquioxanes (F-POSS); Angew. Chem.; Int. Ed. 2008; pp. 4137-4140; vol. 47.

(Continued)

*Primary Examiner* — Lanee Reuther
*Assistant Examiner* — Chun-Cheng Wang
(74) *Attorney, Agent, or Firm* — Barnes & Thornburg LLP; Jason Bernstein

(57) ABSTRACT

Fluorinated polyhedral oligomeric silsesquioxane ("F-POSS") copolymers and terpolymers useful in the field of coatings for enhancing performance of materials surfaces. Also disclosed are methods for making such copolymers and terpolymers.

19 Claims, 1 Drawing Sheet

(56) References Cited

OTHER PUBLICATIONS

Tuteja et al.; Superomniphobic Surfaces for Effective Chemical Shielding; Science; 2007; pp. 1618-1622; vol. 318.
Tuteja et al.; Designing Superoleophobic Surfaces; Proc. Natl. Acad. Sci. U.S.A.; 2008; pp. S18200/1-S18200/29; vol. 105.
Dai et al.; Preparation of novel methyl methacrylate/fluorinated silsesquioxane copolymer film with low surface energy; Science China-Chemistry; Sep. 2010; pp. 2000-2005; vol. 53, No. 9.
Ramirez et al.; Reversible addition-fragmentation chain transfer (RAFT) copolymerization of fluoroalkyl polyhedral oligomeric silsesquioxane (F-POSS) macromers; Polym. Chem.; 2013; pp. 2230-2234; vol. 4.
International Search Report and Written Opinion for International Patent Application No. PCT/US2015/051855; dated Dec. 18, 2015.

* cited by examiner

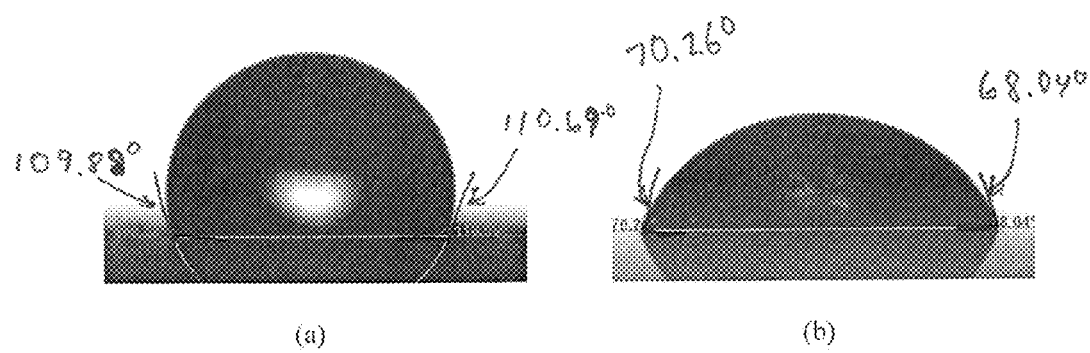

F-POSS COATINGS AND ADDITIVES AND METHODS OF MAKING SAME

CROSS REFERENCE TO RELATED APPLICATION

This application claims the benefit of U.S. Provisional Patent Application No. 62/054,736, filed Sep. 24, 2014, the contents of which is incorporated herein by reference.

FIELD

The present invention disclosure relates to the field of coatings for enhancing performance of materials surfaces. More particularly, exemplary embodiments provide copolymers and terpolymers useful as coatings.

BACKGROUND

Fluorinated polyhedral oligomeric silsesquioxane ("F-POSS") molecules are a subclass of polyhedral oligomeric silsesquioxanes ("POSS") that consists of a silicon-oxide core [$SiO_{1.5}$] with a periphery of long-chain fluorinated alkyl groups. Such alkyl groups include fluorinated triethoxysilanes. F-POSS molecules possess one of the lowest known surface energies leading to the creation of superhydrophobic and oleophobic surfaces. F-POSS material forms a siloxy cage that acts like an inorganic glass-like material, but has organic $R_f$ group substituents at the matrix apices. In an illustrative embodiment, an F-POSS structure can be as shown in formula [1] below.

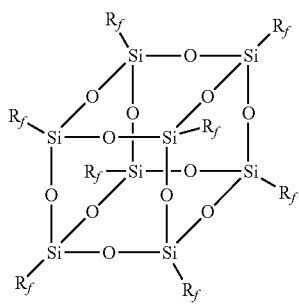

[1]

Each R substituent can be labeled as, for example, $R^{1a}$, $R^{2a}$, $R^{3a}$, $R^{4a}$, $R^{5a}$, $R^{6a}$, $R^{7a}$, or $R^{8a}$ such as shown in formula [2] below.

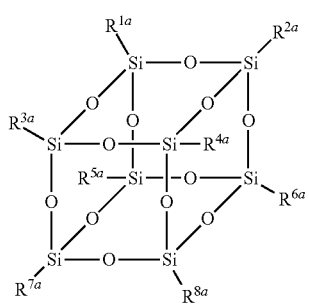

[2]

F-POSS molecules find application in material science. For example, superhydrophobic and superoleophobic surfaces have been produced using F-POSS, either cast on a substrate or blended into a polymer matrix. See for example Chhatre, S. S.; Guardado, J. O.; Moore, B. M.; Haddad, T. S.; Mabry, J. M.; McKinley, G. H.; Cohen, R. E. *ACS Appl. Mater. Interfaces* 2010, 2, 3544-3554; Mabry, J. M.; Vij, A.; Iacono, S. T.; Viers, B. D. *Angew. Chem., Int. Ed.* 2008, 47, 4137-4140; Tuteja, A.; Choi, W.; Mabry, J. M.; McKinely, G. H.; Cohen, R. E. *Proc. Natl. Acad. Sci.* U.S. Pat. No. 2,008,105, S18200/1-S18200/29; and Tuteja, A.; Choi, W.; Ma, M.; Mabry, J. M.; Mazzella, S. A.; Rutledge, G. C.; McKinley, G. H.; Cohen, R. E. *Science* 2007, 318, 1618-1622.

It would be desirable to provide novel functionalized F-POSS compounds for use in materials.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In one aspect, the disclosure provides an F-POSS copolymer comprising the formula

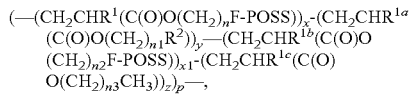
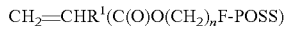

wherein $R^1$, $R^{1a}$, $R^{1b}$, $R^{1c}$, $R^2$, n, n1, n2, n3, x, y, z and p are as defined herein.

In another aspect, the disclosure provides an F-POSS copolymer produced by a process comprising
copolymerizing an F-POSSMA monomer of the formula

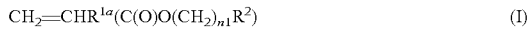

wherein $R^1$ and n are as defined herein, with an acrylate monomer of the formula I

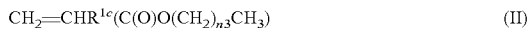
(I)

wherein $R^{1a}$, n1 and $R^2$ are as defined herein, and optionally an acrylate monomer of the formula II $CH_2$=$CHR^{1c}(C(O)O(CH_2)_{n3}CH_3)$ (II)

wherein $R^{1c}$ and n3 are as defined herein.

In another aspect, the disclosure provides a process for preparing an F-POSS copolymer comprising
contacting an F-POSSMA monomer of the formula

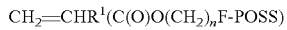

wherein $R^1$ and n are as defined herein, with and acrylate monomer of the formula I

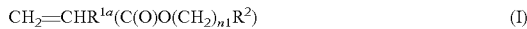
(I)

wherein $R^{1a}$, n1 and $R^2$ are as defined herein, and optionally an acrylate monomer of the formula II

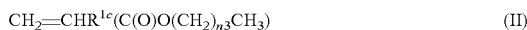
(II)

wherein $R^{1c}$ and n3 are as defined herein; in the presence of an initiator.

In another aspect, the disclosure provides a RAFT polymerization process comprising
contacting an F-POSSMA monomer of the formula

wherein $R^1$ and n are as defined herein, with and acrylate monomer of the formula I

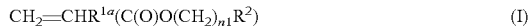
$$CH_2=CHR^{1a}(C(O)O(CH_2)_{n1}R^2) \quad (I)$$

wherein $R^{1a}$, n1 and $R^2$ are as defined herein, and optionally an acrylate monomer of the formula II

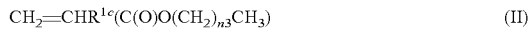
$$CH_2=CHR^{1c}(C(O)O(CH_2)_{n3}CH_3) \quad (II)$$

wherein $R^{1c}$ and n3 are as defined herein; in the presence of an initiator.

BRIEF DESCRIPTION OF THE DRAWING

FIG. 1 shows contact angle measurements of water and hexadecane on glass substrates: (a) water, average 106±5° (b) hexadecane, average 69±2° according to one exemplary embodiment.

DEFINITIONS

As used herein, the term "alkyl" includes a chain of carbon atoms, which is optionally branched and contains from 1 to 20 carbon atoms. It is to be further understood that in certain embodiments, alkyl may be advantageously of limited length, including $C_1$-$C_{12}$, $C_1$-$C_{10}$, $C_1$-$C_9$, $C_1$-$C_8$, $C_1$-$C_7$, $C_1$-$C_6$, and $C_1$-$C_4$, Illustratively, such particularly limited length alkyl groups, including $C_1$-$C_8$, $C_1$-$C_7$, $C_1$-$C_6$, and $C_1$-$C_4$, and the like may be referred to as "lower alkyl." Illustrative alkyl groups include, but are not limited to, methyl, ethyl, n-propyl, isopropyl, n-butyl, isobutyl, sec-butyl, tert-butyl, pentyl, 2-pentyl, 3-pentyl, neopentyl, hexyl, heptyl, octyl, and the like. Alkyl may be substituted or unsubstituted. Typical substituent groups include cycloalkyl, aryl, heteroaryl, heteroalicyclic, hydroxy, alkoxy, aryloxy, mercapto, alkylthio, arylthio, cyano, halo, carbonyl, oxo, (=O), thiocarbonyl, O-carbamyl, N-carbamyl, O-thiocarbamyl, N-thiocarbamyl, C-amido, N-amido, C-carboxy, O-carboxy, nitro, and amino, or as described in the various embodiments provided herein. It will be understood that "alkyl" may be combined with other groups, such as those provided above, to form a functionalized alkyl. By way of example, the combination of an "alkyl" group, as described herein, with a "carboxy" group may be referred to as a "carboxyalkyl" group. Other non-limiting examples include hydroxyalkyl, aminoalkyl, and the like.

As used herein, the term "alkenyl" includes a chain of carbon atoms, which is optionally branched, and contains from 2 to 20 carbon atoms, and also includes at least one carbon-carbon double bond (i.e. C=C). It will be understood that in certain embodiments, alkenyl may be advantageously of limited length, including $C_2$-$C_{12}$, $C_2$-$C_9$, $C_2$-$C_8$, $C_2$-$C_7$, $C_2$-$C_6$, and $C_2$-$C_4$. Illustratively, such particularly limited length alkenyl groups, including $C_2$-$C_8$, $C_2$-$C_7$, $C_2$-$C_6$, and $C_2$-$C_4$ may be referred to as lower alkenyl. Alkenyl may be unsubstituted, or substituted as described for alkyl or as described in the various embodiments provided herein. Illustrative alkenyl groups include, but are not limited to, ethenyl, 1-propenyl, 2-propenyl, 1-, 2-, or 3-butenyl, and the like.

As used herein, the term "alkynyl" includes a chain of carbon atoms, which is optionally branched, and contains from 2 to 20 carbon atoms, and also includes at least one carbon-carbon triple bond (i.e. C≡C). It will be understood that in certain embodiments alkynyl may each be advantageously of limited length, including $C_2$-$C_{12}$, $C_2$-$C_9$, $C_2$-$C_8$, $C_2$-$C_7$, $C_2$-$C_6$, and $C_2$-$C_4$. Illustratively, such particularly limited length alkynyl groups, including $C_2$-$C_8$, $C_2$-$C_7$, $C_2$-$C_6$, and $C_2$-$C_4$ may be referred to as lower alkynyl. Alkenyl may be unsubstituted, or substituted as described for alkyl or as described in the various embodiments provided herein. Illustrative alkenyl groups include, but are not limited to, ethynyl, 1-propynyl, 2-propynyl, 1-, 2-, or 3-butynyl, and the like.

As used herein, the term "aryl" refers to an all-carbon monocyclic or fused-ring polycyclic groups of 6 to 12 carbon atoms having a completely conjugated pi-electron system. It will be understood that in certain embodiments, aryl may be advantageously of limited size such as $C_6$-$C_{10}$ aryl. Illustrative aryl groups include, but are not limited to, phenyl, naphthalenyl and anthracenyl. The aryl group may be unsubstituted, or substituted as described for alkyl or as described in the various embodiments provided herein.

As used herein, the term "cycloalkyl" refers to a 3 to 15 member all-carbon monocyclic ring, an all-carbon 5-member/6-member or 6-member/6-member fused bicyclic ring, or a multicyclic fused ring (a "fused" ring system means that each ring in the system shares an adjacent pair of carbon atoms with each other ring in the system) group where one or more of the rings may contain one or more double bonds but the cycloalkyl does not contain a completely conjugated pi-electron system. It will be understood that in certain embodiments, cycloalkyl may be advantageously of limited size such as $C_3$-$C_{13}$, $C_3$-$C_6$, $C_3$-$C_6$ and $C_4$-$C_6$. Cycloalkyl may be unsubstituted, or substituted as described for alkyl or as described in the various embodiments provided herein. Illustrative cycloalkyl groups include, but are not limited to, cyclopropyl, cyclobutyl, cyclopentyl, cyclopentenyl, cyclopentadienyl, cyclohexyl, cyclohexenyl, cycloheptyl, adamantyl, norbornyl, norbornenyl, 9H-fluoren-9-yl, and the like.

As used herein, the term "heterocycloalkyl" refers to a monocyclic or fused ring group having in the ring(s) from 3 to 12 ring atoms, in which at least one ring atom is a heteroatom, such as nitrogen, oxygen or sulfur, the remaining ring atoms being carbon atoms. Heterocycloalkyl may optionally contain 1, 2, 3 or 4 heteroatoms. Heterocycloalkyl may also have one of more double bonds, including double bonds to nitrogen (e.g. C=N or N=N) but does not contain a completely conjugated pi-electron system. It will be understood that in certain embodiments, heterocycloalkyl may be advantageously of limited size such as 3- to 7-membered heterocycloalkyl, 5- to 7-membered heterocycloalkyl, and the like. Heterocycloalkyl may be unsubstituted, or substituted as described for alkyl or as described in the various embodiments provided herein. Illustrative heterocycloalkyl groups include, but are not limited to, oxiranyl, thianaryl, azetidinyl, oxetanyl, tetrahydrofuranyl, pyrrolidinyl, tetrahydropyranyl, piperidinyl, 1,4-dioxanyl, morpholinyl, 1,4-dithianyl, piperazinyl, oxepanyl, 3,4-dihydro-2H-pyranyl, 5,6-dihydro-2H-pyranyl, 2H-pyranyl, 1,2,3,4-tetrahydropyridinyl, and the like.

As used herein, the term "heteroaryl" refers to a monocyclic or fused ring group of 5 to 12 ring atoms containing one, two, three or four ring heteroatoms selected from nitrogen, oxygen and sulfur, the remaining ring atoms being carbon atoms, and also having a completely conjugated pi-electron system. It will be understood that in certain embodiments, heteroaryl may be advantageously of limited size such as 3- to 7-membered heteroaryl, 5- to 7-membered heteroaryl, and the like. Heteroaryl may be unsubstituted, or substituted as described for alkyl or as described in the various embodiments provided herein. Illustrative heteroaryl groups include, but are not limited to, pyrrolyl, furanyl, thiophenyl, imidazolyl, oxazolyl, thiazolyl, pyrazolyl, pyridinyl, pyrimidinyl, quinolinyl, isoquinolinyl, purinyl, tetrazolyl, triazinyl, pyrazinyl, tetrazinyl, quinazolinyl, quinoxalinyl, thienyl, isoxazolyl, isothiazolyl, oxadiazolyl, thiadiazolyl, triazolyl, benzimidazolyl, benzoxazolyl, benzthiazolyl, benzisoxazolyl, benzisothiazolyl and carbazoloyl, and the like.

As used herein, "hydroxy" or "hydroxyl" refers to an —OH group.

As used herein, "alkoxy" refers to both an —O-(alkyl) or an —O-(unsubstituted cycloalkyl) group. Representative examples include, but are not limited to, methoxy, ethoxy, propoxy, butoxy, cyclopropyloxy, cyclobutyloxy, cyclopentyloxy, cyclohexyloxy, and the like.

As used herein, "aryloxy" refers to an —O-aryl or an —O-heteroaryl group. Representative examples include, but are not limited to, phenoxy, pyridinyloxy, furanyloxy, thienyloxy, pyrimidinyloxy, pyrazinyloxy, and the like, and the like.

As used herein, "mercapto" refers to an —SH group.

As used herein, "alkylthio" refers to an —S-(alkyl) or an —S-(unsubstituted cycloalkyl) group. Representative examples include, but are not limited to, methylthio, ethylthio, propylthio, butylthio, cyclopropylthio, cyclobutylthio, cyclopentylthio, cyclohexylthio, and the like.

As used herein, "arylthio" refers to an —S-aryl or an —S-heteroaryl group. Representative examples include, but are not limited to, phenylthio, pyridinylthio, furanylthio, thienylthio, pyrimidinylthio, and the like.

As used herein, "halo" or "halogen" refers to fluorine, chlorine, bromine or iodine.

As used herein, "trihalomethyl" refers to a methyl group having three halo substituents, such as a trifluoromethyl group.

As used herein, "cyano" refers to a —CN group.

As used herein, "sulfinyl" refers to a —S(O)$R^a$ group, where $R^a$ is any variable group as described in the various embodiments provided herein, or $R^a$ may be a hydroxyl group.

As used herein, "sulfonyl" refers to a —S(O)$_2$$R^a$ group, where $R^a$ is any variable group as described in the various embodiments provided herein, or $R^a$ may be a hydroxyl group.

As used herein, "S-sulfonamido" refers to a —S(O)$_2$NR$^a$R$^b$ group, where $R^a$ and $R^b$ are any variable group as described in the various embodiments provided herein.

As used herein, "N-sulfonamido" refers to a —NR$^a$S(O)$_2$R$^b$ group, where $R^a$ and $R^b$ are any variable group as described in the various embodiments provided herein.

As used herein, "O-carbamyl" refers to a —OC(O)NR$^a$R$^b$ group, where $R^a$ and $R^b$ are any variable group as described in the various embodiments provided herein.

As used herein, "N-carbamyl" refers to an R$^a$OC(O)NR$^b$— group, where $R^a$ and $R^b$ are any variable group as described in the various embodiments provided herein.

As used herein, "O-thiocarbamyl" refers to a —OC(S)NR$^a$R$^b$ group, where $R^a$ and $R^b$ are any variable group as described in the various embodiments provided herein.

As used herein, "N-thiocarbamyl" refers to a R$^a$OC(S)NR$^b$— group, where $R^a$ and $R^b$ are any variable group as described in the various embodiments provided herein.

As used herein, "amino" refers to an —NR$^a$R$^b$ group, where $R^a$ and $R^b$ are any variable group as described in the various embodiments provided herein.

As used herein, "C-amido" refers to a —C(O)NR$^a$R$^b$ group, where $R^a$ and $R^b$ are any variable group as described in the various embodiments provided herein.

As used herein, "N-amido" refers to a R$^a$C(O)NR$^b$— group, where $R^a$ and $R^b$ are any variable group as described in the various embodiments provided herein.

As used herein, "nitro" refers to a —NO$_2$ group.

As used herein, the term "long-chain fluorinated alkyl" means any straight chain or branched chain alkyl group having from 5 to 12 carbon atoms in the longest continuous chain of carbon atoms as counted from the point of attachment of the chain of carbon atoms to the silicon atom at any apex of the silicon-oxide core, where at least one hydrogen atom in the straight chain or branched chain alkyl group is replaced by a fluorine atom. Any number of hydrogen atoms in the straight chain or branched chain alkyl group can be replaced with fluorine atoms within the meaning of "long-chain fluorinated alkyl" as used herein. For example, the terminal methyl group of a straight chain alkyl group having six carbon atoms in the chain (e.g. a hexyl group) can have each of the pendent hydrogen atoms replaced by a fluorine atom (e.g. a trifluoromethyl) to provide a long chain fluorinated alkyl group having the formula —CH$_2$CH$_2$CH$_2$CH$_2$CH$_2$CF$_3$. In another example, the last two carbon atoms of a straight chain alkyl group having six carbon atoms in the chain can have each of the pendent hydrogen atoms replaced by a fluorine atom (e.g. a trifluoroethyl) to provide a long chain fluorinated alkyl group having the formula —CH$_2$CH$_2$CH$_2$CH$_2$CF$_2$CF$_3$. This exemplary pattern can be continued to include within the definition of "long chain fluorinated alkyl" groups of the formula —CH$_2$CH$_2$CH$_2$CF$_2$CF$_2$CF$_3$, —CH$_2$CH$_2$CF$_2$CF$_2$CF$_2$CF$_3$, —CH$_2$CF$_2$CF$_2$CF$_2$CF$_2$CF$_3$, and —CF$_2$CF$_2$CF$_2$CF$_2$CF$_2$CF$_3$. As is commonly known in the art, an alkyl group where every hydrogen atoms in the chain is replaced by a fluorine atom is known as a "perfluorinated" alkyl group.

When less than all of the carbon atoms in the longest continuous chain of carbon atoms have hydrogens replaced by fluorine atoms, the "long chain fluorinated alkyl" group can be identified by the shorthand X/Y, where X is the number of terminal carbon atoms in the longest continuous chain of carbon atoms as counted from the point of attachment of the chain of carbon atoms to the silicon atom at any apex of the silicon-oxide core, and Y is the remaining number of carbon atoms in the longest continuous chain of carbon atoms on which hydrogen atoms are not replaced by fluorine atoms. For example, a long chain fluorinated alkyl group of the formula —CH$_2$CH$_2$CF$_2$CF$_2$CF$_2$CF$_3$ can be given the shorthand 4/2. Other exemplary long chain fluorinated alkyl groups include but are not limited to 3/3, 6/2, 4/4, 8/2, 6/4 and the like.

When the shorthand X/Y is used herein in connection with F-POSS, the name provided refers to the F-POSS molecule each of the groups attached to the apices of the silicon-oxide core is of the long chain fluorinated alkyl group type defined by the X/Y. For example, 6/2 F-POSS refers to an F-POSS molecule of Formula I, wherein each of the R groups at the apices of the silicon-oxide core is a 6/2 long chain fluorinated alkyl group as defined herein.

As used herein, "optional" or "optionally" means that the subsequently described event or circumstance may but need not occur, and that the description includes instances where the event or circumstance occurs and instances in which it does not. For example, "heterocycle group optionally substituted with an alkyl group" means that the alkyl may but need not be present, and the description includes situations where the heterocycle group is substituted with an alkyl group and situations where the heterocycle group is not substituted with the alkyl group.

As used herein, "independently" means that the subsequently described event or circumstance is to be read on its own relative to other similar events or circumstances. For example, in a circumstance where several equivalent hydrogen groups are optionally substituted by another group described in the circumstance, the use of "independently optionally" means that each instance of a hydrogen atom on the group may be substituted by another group, where the groups replacing each of the hydrogen atoms may be the same or different. Or for example, where multiple groups exist all of which can be selected from a set of possibilities, the use of "independently" means that each of the groups can be selected from the set of possibilities separate from any other group, and the groups selected in the circumstance may be the same or different.

DETAILED DESCRIPTION

In conventional F-POSS synthesis, the F-POSS molecule has a matrix structure having eight apices, each apex comprising silicon. Each apex also has a substituent moiety R, which comprises a C-F chain having a carbon chain length $C_n$, where n is the number of carbons in the chain. 6/2 F-POSS is a $C_8$ molecule as the R substituent has 8 carbons. This F-POSS is designated as 6/2 as it has 6 C-F groups and 2 C-H groups. See formula [3] below.

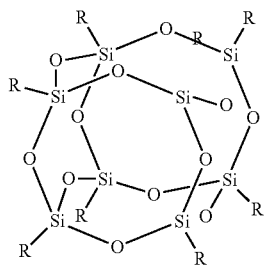

6/2 F-POSS
R = CH$_2$CH$_2$CF$_2$CF$_2$CF$_2$CF$_2$CF$_2$CF$_3$

4/2 F-POSS is a C6 molecule as the R substituent has 6 carbons comprising 4 C—F groups and 2 C—H groups. See formula [4] below.

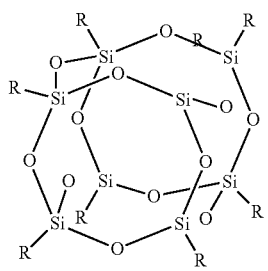

4/2 F-POSS
R = CH$_2$CH$_2$CF$_2$CF$_2$CF$_2$CF$_3$

F-POSS can also include a methacrylic acid (MAA) moiety. In an illustrative embodiment, F-POSS methacrylic acid (a.k.a. F-POSSMA) can be as shown in formula [5] below.

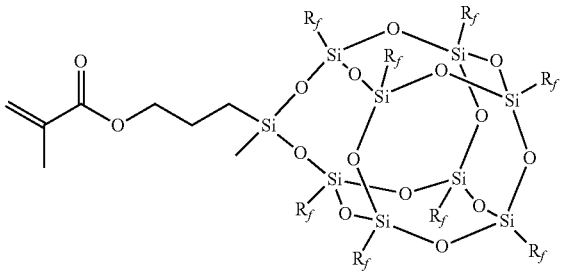

wherein $R_f$ is a long-chain fluorinated alkyl group as defined herein.

It will be appreciated that other F-POSSMA monomers are within the scope of the present disclosure. For example, F-POSSMA monomers of the formula

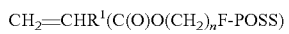

$$CH_2=CHR^1(C(O)O(CH_2)_n\text{F-POSS})$$

wherein $R^1$ is H or —CH$_3$, and n is an integer from 1 to 5 are within the scope of the present disclosure. Such F-POSS monomers can also be represented by the formula [5a]

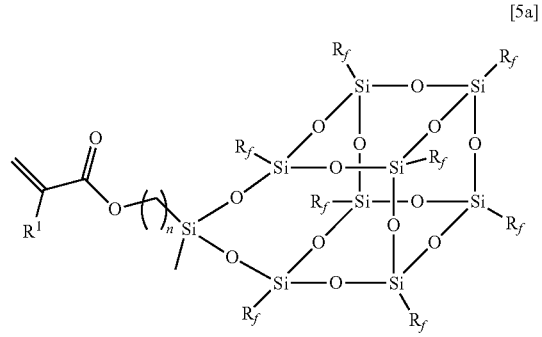

wherein $R^1$, n and $R_f$ are as defined herein.

It will be appreciated that F-POSSMA monomers can be prepared according to methods well known in the art, such as, those described in U.S. Patent Publication 2015/0065674.

The polymers described herein can be prepared according to any polymerization process known in the art such as, radical polymerization or reversible addition-fragmentation chain transfer or RAFT polymerization. In some embodiments, the polymerization is a radical polymerization. In some embodiments, the radical polymerization is carried out in the presence of an initiator. The initiator can be any initiator commonly known in the art such thermal decomposition initiators, photolysis initiators, redox initiators, persulfate initiators, ionizing radiation, electrochemical initiators, and the like. In some embodiments, the initiator can be a thermal decomposition initiator, such as a peroxide compound, such as dicumyl peroxide, or an azo compounds, such as 2,2'-azobis-(2-methylpropionitrile) (AIBN), 4,4'-azobis(4-cyanovaleric acid), 1,1'-azobis(cyclohexanecarbonitrile), 2,2'-azobis(2-methylpropionamidine)dihydrochloride, 2,2'-azobis(2-methylpropionitrile), and the like.

The processes described herein can be carried out at a range of temperatures common to polymerization reactions. For example, in some embodiments, copolymerization can be carried out by contacting at a temperature of about 0° C. to about 90° C. In some embodiments, the temperature can be about 25° C. to about 70° C. In some embodiments, the temperature can be about 40° C. to about 70° C. In some embodiments, the temperature can be about 60° C.

It will be appreciated that depending on the specific properties of the F-POSS copolymer that are desired, that the processes described herein can be carried out using a variety of monomers (e.g. acrylate monomer of the formula I, acrylate monomer of the formula II, acrylate monomers, methacrylate monomers, or F-POSSMA monomers), and in a variety of molar ratios. For example, in some embodiments, the molar ratio of F-POSSMA monomer to acrylate or methacrylate monomer to the F-POSSMA monomer can be from about 20:1 to about 1200:1. In some embodiments, the molar ratio of acrylate monomer or methacrylate to the F-POSSMA monomer can be from about 50:1 to about 1000:1. In some embodiments, the molar ratio of acrylate or methacrylate monomer to the F-POSSMA monomer can be from about 100:1 to about 800:1. It will be appreciated that the molar ratio of acrylate or methacrylate monomer to the F-POSSMA monomer can be any ratio range included in the range from about 20:1 to about 1200:1, such as 20:1, 30:1; 40:1, 50:1, 100:1, 150:1, 200:1, 250:1, 300:1, 350:1, 400:1, 450:1, 500:1, 550:1, 600:1, 650:1, 700:1, 750:1, 800:1, 850:1, 900:1, 950:1, 1000:1, 1050:1, 1100:1, 1150:1 and 1200:1.

In some embodiments, the processes described herein involve the copolymerization of an F-POSSMA monomer of the formula as described with an acrylate monomer of the formula I and an acrylate monomer of the formula II. It will be appreciated that such processes can be carried out at a variety of molar ratios of acrylate monomer of the formula I and acrylate monomer of the formula II to F-POSSMA monomers of the formula described. In some embodiments, the molar ratio of acrylate monomer of the formula I and acrylate monomer of the formula II to the F-POSSMA monomer can be from about 20:1 to about 1200:1. In some embodiments, the molar ratio can be from about 50:1 to about 1000:1. In some embodiments, the molar ratio can be from about 100:1 to about 800:1. It will be appreciated that the molar ratio of acrylate and methacrylate monomer to the F-POSSMA monomer can be any ratio range included in the range from about 20:1 to about 1200:1, such as 20:1, 30:1; 40:1, 50:1, 100:1, 150:1, 200:1, 250:1, 300:1, 350:1, 400:1, 450:1, 500:1, 550:1, 600:1, 650:1, 700:1, 750:1, 800:1, 850:1, 900:1, 950:1, 1000:1, 1050:1, 1100:1, 1150:1 and 1200:1.

The processes described herein can be carried out in a variety of organic solvents. It will be appreciated that the organic solvent can be any organic solvent known in the art, or a mixture thereof. In some embodiments, the organic solvent can be selected from the groups consisting of THF, ethyl ether, ethyl acetate, DMF, hexafluorobenzene, benzene, toluene, xylene, dichloromethane, hexanes, DMSO, and mixtures thereof. In some embodiments, the organic solvent mixture can be a mixture of two or more solvents in any ratio. In some embodiments, the ratio of organic solvents can be 1:1, 2:1, 3:1, 4:1, 5:1, 6:1, 7:1, 8:1, 10:1, 15:1, 20:1, 50:1, and any other ratio in between. In some embodiments, the mixture of solvents can be a mixture of hexafluorobenzene and THF. In some embodiments, the mixture of solvents can be a mixture of hexafluorobenzene and THF in a ratio of about 4:1. In some embodiments, the solvent or mixture of solvents can be anhydrous.

The F-POSS copolymers described herein can be prepared from a variety of acrylate monomers, such as an acrylate monomer of the formula I as described herein or an acrylate monomer of the formula II as described herein. It will be appreciated that the acrylate monomer of the formula I as described herein and the acrylate monomer of the formula II as described herein include both acrylates and methacrylates depending on whether $R^{1a}$ or $R^{1c}$ are hydrogen or methyl. It will be further appreciated that an acrylate monomer of the formula I includes, but is not limited to, common monomers such as 2-isocyanatoethyl 2-methylprop-2-enoate (a.k.a Karenze MOI), 2-hydroxyethyl methacrylate (a.k.a HEMA), 2-hydroxyethyl acrylate, 2-isocyanatoethylacrylate, and the like. It will be further appreciated that an acrylate monomer of the formula II includes, but is not limited to, common monomers such as methylmethacrylate, methylacrylate, and the like.

Reaction 1

F-POSSMA and hydroxyethylmethacrylate (as shown in formula [6] below) are reacted to produce a copolymer of F-POSSMA and hydroxyethylmethacrylate (HEMA).

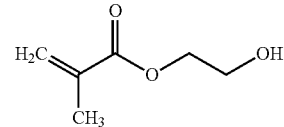

[6]

F-POSS methacrylate (F-POSSMA) and 2-hydroxyethylmethacrylate (HEMA) are dissolved in stoichiometric amounts in mixture of hexafluorobenzene and tetrahydrofuran in the presence of 2,2'-Azobis-(2-methylpropionitrile) (AIBN; free radical initiator) at 65° C. to produce a copolymer of F-POSSMA and HEMA under nitrogen.

Utilizing the above general procedure, other copolymers of F-POSS methacrylate (F-POSSMA) and hydroxyalkylmethacrylates or hydroxyalkylacrylates can be formed and shown as $(F\text{-POSSMA})_x(CH_2CH(CH_3)COO(CH_2)_nOH)_y$, where n=1-18, preferably, 1-12.

F-POSSMA monomers are reacted with other methacrylates and acrylates to produce further polymers.

Reaction 2

F-POSSMA and isocyanatoethyl methacrylate (shown in formula [7] below) are reacted to produce a copolymer of F-POSSMA and isocyanatoethyl methacrylate (Karenze MOI).

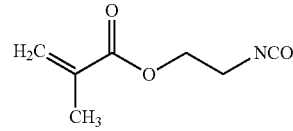

[7]

F-POSS methacrylate (F-POSSMA) and isocyanatoethyl methacrylate (Karenze MOI) are dissolved in a 4:1 mixture of hexafluorobenzene and anhydrousTHF in the presence of 22,2'-Azobis(2-methylpropionitrile (AIBN) at 70° C. to produce a copolymer (poly(isoCN—F-POSSMA) of F-POSSMA and Karenze MOI under nitrogen.

Utilizing the same reaction conditions as above, F-POSSMA can be reacted with other isocyanatoalkyl methacrylates or isocyanatoalkylacrylates to form copolymers.

It will be appreciated that the copolymers can be further functionalized. For example, in some embodiments, copolymers produced by the processes described can be functionalized by reacting the isocyanate moiety with an amine to produce a urea. In some embodiments, copolymers produced by the processes described can be functionalized by reacting the isocyanate moiety with an alcohol to produce a urethane. In some embodiments, copolymers produced by the processes described can be functionalized by reacting the isocyanate moiety with a thiol to produce a thiocarbamate (urethane).

Applications

Exemplary embodiments of compositions disclosed herein may be useful in the formulation of protective coatings, such as, but not limited to, repelling oil or other hydrophobic materials, water or other hydrophilic materials, or the like. Exemplary embodiments of compositions disclosed herein may be useful in improving the stability and longevity of formulations containing fluorinated, halogenated or other additive materials that ordinarily would not have adequately stable or durable homogeneity.

In an illustrative embodiment, compositions disclosed herein can be used as coatings or integrated into polycarbonate material. In exemplary embodiments, an F-POSS and/or F-POSSMA coating as described herein can be about 200 nm to about 5 µm thick. In one exemplary embodiment, the coating or material can be used on optical lenses. In one exemplary embodiment, a disclosed composition can be a coating on a camera lens. F-POSSMA compositions on a camera lens can increase durability and resiliency. In a specific embodiment, the camera lens can be a camera lens exposed to environmental elements, such as, but not limited to, a lens in an outdoor surveillance camera, in a camera on a vehicle, in a camera on an airplane, in a camera on a helicopter, etc.

In one exemplary embodiment, F-POSSMA compositions can be produced by melt blending, UV curing, and injection molding. Using known procedures, F-POSSMA and/or F-POSSMA derivatives are melted with a polycarbonate. This melt can then be injection molded into a disc of polycarbonate with F-POSSMA, F-POSS, vinyl F-POSS, blends, and derivatives thereof. In an embodiment, a method of injection molding can include an F-POSS or F-POSSMA where the F-POSS is 4/2 F-POSS or 6/2 F-POSS. In an embodiment, the F-POSSMA can be a derivative as disclosed in the reactions disclosed below. In one exemplary embodiment, a method of injection molding can include an F-POSS blend. A F-POSS blend includes synthetic blend 1 (SB1), synthetic blend 2 (SB2), or synthetic blend 3 (SB3), where SB1 is a 3:1 ratio of 1H, 1H, 2H, 2H perfluorooctyltriethosysilane:1H, 1H, 2H, 2H-Nonafluorohexyltriethoxysilane, SB2 is a 1:1 ratio of 1H, 1H, 2H, 2H perfluorooctyltriethosysilane:1H, 1H, 2H, 2H-Nonafluorohexyltriethoxysilane, and SB3 is a 1:3 ratio of 1H, 1H, 2H, 2H perfluorooctyltriethosysilane:1H, 1H, 2H, 2H-Nonafluorohexyltriethoxysilane. Basically, SB1 is 75% 6/2 F-POSS and 25% 4/2 F-POSS; SB2 is 50% 6/2 F-POSS and 50% 4/2 F-POSS; and SB3 is 25% 6/2 F-POSS and 75% 4/2 F-POSS.

In another exemplary embodiment, compositions comprising F-POSSMA and derivatives thereof as disclosed herein can also be incorporated into plastics, paint, UV curable coatings, adhesives and other high performance polymers. In another embodiment, compositions comprising F-POSSMA and derivatives thereof as disclosed herein can also be coated on glass.

The copolymers of the present disclosure can be described as embodiments in any of the following numbered clauses. It will be understood that any of the embodiments described herein can be used in connection with any other embodiments described herein to the extent that the embodiments do not contradict one another.

1. An F-POSS copolymer comprising the formula

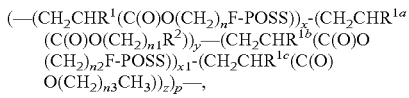

wherein $R^1$, $R^{1a}$, $R^{1b}$ and $R^{1c}$ are each independently H or —$CH_3$;
$R^2$ is $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl, —$OR^3$, —NCO, —NCS, —SCN,
—$OC(O)R^3$, —$OC(O)NR^3R^{3'}$, —$OS(O)R^3$, —$OS(O)_2R^3$, —$SR^3$, —$SC(O)R^3$, —$S(O)R^3$, —$S(O)_2R^3$,
—$S(O)_2OR^3$, —$S(O)NR^3R^{3'}$, —$S(O)_2NR^3R^{3'}$, —$OS(O)NR^3R^{3'}$, —$OS(O)_2NR^3R^{3'}$, —$NR^3R^{3'}$, —$NR^3C(O)R^4$, —$NR^3C(O)OR^4$, —$NR^3C(O)NR^4R^{4'}$, —$NR^3S(O)R^4$, —$NR^3S(O)_2R^4$, —$NR^3S(O)NR^3R^{4'}$,
—$NR^3S(O)_2NR^4R^{4'}$, —$P(O)(OR^3)_2$, —$C(O)R^3$, —$C(O)OR^3$ or —$C(O)NR^3R^{3'}$; wherein each hydrogen atom in $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl is independently optionally substituted by halogen, $C_1$-$C_6$ alkyl, $C_2$-$C_6$ alkenyl, $C_2$-$C_6$ alkynyl, $C_3$-$C_6$ cycloalkyl, 3- to 7-membered heterocycloalkyl, $C_6$-$C_{10}$ aryl, 5- to 7-membered heteroaryl, —$OR^5$, —$OC(O)R^5$, —$OC(O)NR^5R^{5'}$,
—$OS(O)R^5$, —$OS(O)_2R^5$, —$SR^5$, —$SC(O)R^5$, —$S(O)R^5$, —$S(O)_2R^5$, —$S(O)_2OR^5$, —$S(O)NR^5R^{5'}$,
—$S(O)_2NR^5R^{5'}$, —$OS(O)NR^5R^{5'}$, —$OS(O)_2NR^5R^{5'}$, —$NR^5R^{5'}$, —$NR^5C(O)R^6$, —$NR^5C(O)OR^6$,
—$NR^5C(O)NR^6R^{6'}$, —$NR^5S(O)R^6$, —$NR^5S(O)_2R^6$, —$NR^5S(O)NR^6R^{6'}$, —$NR^5S(O)_2NR^6R^{6'}$,
—$P(O)(OR^5)_2$, —$C(O)R^5$, —$C(O)OR^5$, —$C(O)NR^5R^{5'}$, —$Si(R^5)_3$, —$Si(OR^5)_3$, —$Si(OR^5)_2R^6$ or —$Si(OR^5)(R^6)_2$;

$R^3$, $R^{3'}$, $R^4$ and $R^{4'}$ are each independently H, $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl, wherein each hydrogen atom in $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl is independently optionally substituted by halogen, $C_1$-$C_6$ alkyl, $C_2$-$C_6$ alkenyl, $C_2$-$C_6$ alkynyl, $C_3$-$C_6$ cycloalkyl, 3- to 7-membered heterocycloalkyl, $C_6$-$C_{10}$ aryl, 5- to 7-membered heteroaryl,
—$OR^5$, —$OC(O)R^5$, —$OC(O)NR^5R^{5'}$, —$OS(O)R^5$, —$OS(O)_2R^5$, —$SR^5$, —$SC(O)R^5$, —$S(O)R^5$, —$S(O)_2R^5$,
—$S(O)_2OR^5$, —$S(O)NR^5R^{5'}$, —$S(O)_2NR^5R^{5'}$, —$OS(O)NR^5R^{5'}$, —$OS(O)_2NR^5R^{5'}$, —$NR^5R^{5'}$, —$NR^5C(O)R^6$, —$NR^5C(O)OR^6$, —$NR^5C(O)NR^6R^{6'}$, —$NR^5S(O)R^6$, —$NR^5S(O)_2R^6$, —$NR^5S(O)NR^6R^{6'}$,
—$NR^5S(O)_2NR^6R^{6'}$, —$P(O)(OR^5)_2$, —$C(O)R^5$, —$C(O)OR^5$, —$C(O)NR^5R^{5'}$, —$Si(R^5)_3$, —$Si(OR^5)_3$,
—$Si(OR^5)_2R^6$ or —$Si(OR^5)(R^6)_2$;

each $R^5$, $R^{5'}$, $R^6$ and $R^{6'}$ is independently selected from the group consisting of H, $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl;
n is an integer from 1 to 5;
n1 is an integer from 1 to 18;
n2 is an integer from 1 to 5;
n3 is an integer from 0 to 5;
p is an integer from 1 to about 10;
x is an integer from 1 to about 5;

x1 is an integer from 0 to about 3;
y is an integer from about 50 to about 1200; and
z is an integer from 0 to about 1000.

2. The F-POSS copolymer of clause 1, wherein $R^2$ is —OH or —NCO.

3. The F-POSS copolymer of clause 1 or 2, wherein n is 3.

4. The F-POSS copolymer of any one of the preceding clauses, wherein $R^1$ is —$CH_3$.

5. The F-POSS copolymer of any one of the preceding clauses, wherein $R^{1a}$ is —$CH_3$.

6. The F-POSS copolymer of any one of the preceding clauses, wherein n1 is 2.

7. The F-POSS copolymer of any one of the preceding clauses, wherein x1 is 0.

8. The F-POSS copolymer of any one of the preceding clauses, wherein z is 0.

9. The F-POSS copolymer of any one of the preceding clauses, wherein $R^2$ is —OH.

10. The F-POSS copolymer of any one of clauses 1 to 6, wherein $R^2$ is —NCO.

11. The F-POSS copolymer of any one of clauses 1 to 6 or 10, wherein z is an integer from about 50 to about 1000.

12. The F-POSS copolymer of any one of clauses 1 to 6, 10 or 11, wherein x1 is an integer from 1 to about 3.

13. The F-POSS copolymer of any one of clauses 1 to 6 or 10 to 12, wherein $R^{1b}$ is —$CH_3$.

14. The F-POSS copolymer of any one of clauses 1 to 6 or 10 to 13, wherein n2 is 3.

15. The F-POSS copolymer of any one of clauses 1 to 6 or 10 to 14, wherein $R^{1c}$ is —$CH_3$.

16. The F-POSS copolymer of any one of clauses 1 to 6 or 10 to 15, wherein n3 is 0.

17. An F-POSS copolymer produced by a process comprising
copolymerizing an F-POSSMA monomer of the formula

$$CH_2=CHR^1(C(O)O(CH_2)_n\text{F-POSS})$$

wherein $R^1$ is H or —$CH_3$, and n is an integer from 1 to 5, wherein with an acrylate monomer of the formula I

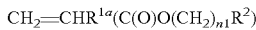
$$CH_2=CHR^{1a}(C(O)O(CH_2)_{n1}R^2) \quad (I)$$

wherein
$R^{1a}$ is H or —$CH_3$;
$R^2$ is $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl, —$OR^3$, —NCO, —NCS, —SCN,
—OC(O)$R^3$, —OC(O)N$R^3R^{3'}$, —OS(O)$R^3$, —OS(O)$_2R^3$, —S$R^3$, —SC(O)$R^3$, —S(O)$R^3$, —S(O)$_2R^3$,
—S(O)$_2$O$R^3$, —S(O)N$R^3R^{3'}$, —S(O)$_2$N$R^3R^{3'}$, —OS(O)N$R^3R^{3'}$, —OS(O)$_2$N$R^3R^{3'}$, —N$R^3R^{3'}$, —N$R^3$C(O)$R^4$, —N$R^3$C(O)O$R^4$, —N$R^3$C(O)N$R^4R^{4'}$, —N$R^3$S(O)$R^4$, —N$R^3$S(O)$_2R^4$, —N$R^3$S(O)N$R^3R^{4'}$,
—N$R^3$S(O)$_2$N$R^4R^{4'}$, —P(O)(O$R^3$)$_2$, —C(O)$R^3$, —C(O)O$R^3$ or —C(O)N$R^3R^{3'}$; wherein each hydrogen atom in $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl is independently optionally substituted by halogen, $C_1$-$C_6$ alkyl, $C_2$-$C_6$ alkenyl, $C_2$-$C_6$ alkynyl, $C_3$-$C_6$ cycloalkyl, 3- to 7-membered heterocycloalkyl, $C_6$-$C_{10}$ aryl, 5- to 7-membered heteroaryl,
—O$R^5$, —OC(O)$R^5$, —OC(O)N$R^5R^{5'}$,
—OS(O)$R^5$, —OS(O)$_2R^5$, —S$R^5$, —SC(O)$R^5$, —S(O)$R^5$,
—S(O)$_2R^5$, —S(O)$_2$O$R^5$, —S(O)N$R^5R^{5'}$, —OS(O)N$R^5R^{5'}$,
—N$R^5R^{5'}$, —N$R^5$C(O)$R^6$, —N$R^5$C(O)O$R^6$,
—N$R^5$C(O)N$R^6R^{6'}$, —N$R^5$S(O)$R^6$, —N$R^5$S(O)$_2R^6$,
—N$R^5$S(O)N$R^6R^{6'}$, —N$R^5$S(O)$_2$N$R^6R^{6'}$,
—P(O)(O$R^5$)$_2$, —C(O)$R^5$, —C(O)O$R^5$, —C(O)N$R^5R^{5'}$,
—Si($R^5$)$_3$, —Si(O$R^5$)$_3$, —Si(O$R^5$)$_2R^6$ or
—Si(O$R^5$)($R^6$)$_2$;

$R^3$, $R^{3'}$, $R^4$ and $R^{4'}$ are each independently H, $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl, wherein each hydrogen atom in $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl is independently optionally substituted by halogen, $C_1$-$C_6$ alkyl, $C_2$-$C_6$ alkenyl, $C_2$-$C_6$ alkynyl, $C_3$-$C_6$ cycloalkyl, 3- to 7-membered heterocycloalkyl, $C_6$-$C_{10}$ aryl, 5- to 7-membered heteroaryl,
—O$R^5$, —OC(O)$R^5$, —OC(O)N$R^5R^{5'}$, —OS(O)$R^5$, —OS(O)$_2R^5$, —S$R^5$, —SC(O)$R^5$, —S(O)$R^5$, —S(O)$_2R^5$,
—S(O)$_2$O$R^5$, —S(O)N$R^5R^{5'}$, —S(O)$_2$N$R^5R^{5'}$, —OS(O)N$R^5R^{5'}$, —OS(O)$_2$N$R^5R^{5'}$, —N$R^5R^{5'}$, —N$R^5$C(O)$R^6$,
—N$R^5$C(O)O$R^6$, —N$R^5$C(O)N$R^6R^{6'}$, —N$R^5$S(O)$R^6$, —N$R^5$S(O)$_2R^6$, —N$R^5$S(O)N$R^6R^{6'}$,
—N$R^5$S(O)$_2$N$R^6R^{6'}$, —P(O)(O$R^5$)$_2$, —C(O)$R^5$, —C(O)O$R^5$, —C(O)N$R^5R^{5'}$, —Si($R^5$)$_3$, —Si(O$R^5$)$_3$,
—Si(O$R^5$)$_2R^6$ or —Si(O$R^5$)($R^6$)$_2$;

each $R^5$, $R^{5'}$, $R^6$ and $R^{6'}$ is independently selected from the group consisting of H, $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl; and
n1 is an integer from 1 to 18;
and optionally an acrylate monomer of the formula II $$CH_2=CHR^{1c}(C(O)O(CH_2)_{n3}CH_3) \quad (II)$$

wherein $R^{1c}$ is H or —$CH_3$; and n3 is an integer from 0 to 5.

18. The copolymer of clause 17, wherein the molar ratio of the acrylate monomer to the F-POSSMA monomer is from about 100:1 to about 800:1.

19. The copolymer of clause 17, wherein the molar ratio of the acrylate monomers I and II to the F-POSSMA monomer is from about 40:1 to about 800:1.

20. The copolymer of any one of clauses 17 to 19, wherein $R^{1a}$ is —$CH_3$.

21. The copolymer of any one of clauses 17 to 20, wherein $R^2$ is —OH or —NCO.

22. The copolymer of any one of clauses 17 to 21, wherein n1 is 2.

23. The copolymer of any one of clauses 17 to 22, wherein $R^2$ is —NCO.

24. The copolymer of any one of clauses 17 to 22, wherein $R^2$ is —OH.

25. The copolymer of any one of clauses 17 to 24, wherein $R^{1a}$ is —$CH_3$.

26. The copolymer of any one of clauses 17 to 25, wherein n3 is 2.

27. The copolymer of any one of clauses 17 to 26, wherein the contacting is carried out in the presence of an initiator.

28. The copolymer of any one of clauses 17 to 27, wherein the contacting is carried out in the presence of AIBN.

29. The copolymer of any one of clauses 17 to 28, wherein the contacting is carried out in the presence of an organic solvent.

30. The copolymer of any one of clauses 17 to 29, wherein the contacting is carried out in the presence of an organic solvent selected from the groups consisting of THF, ethyl ether, ethyl acetate, DMF, hexafluorobenzene, benzene, toluene, xylene, dichloromethane, hexanes, DMSO, and mixtures thereof.

31. The copolymer of any one of clauses 17 to 30, wherein the contacting is carried out in the presence of a mixture of THF and hexafluorobenzene.

32. The copolymer of any one of clauses 17 to 31, wherein the contacting is carried out at a temperature of from about 0° C. to about 90° C.

33. The copolymer of any one of clauses 17 to 32, wherein the contacting is carried out at a temperature of from about 25° C. to about 70° C.

34. The copolymer of any one of clauses 17 to 33, wherein the contacting is carried out under an inert atmosphere.

35. The copolymer of any one of clauses 17 to 34, wherein the contacting is carried out under nitrogen.

36. A process of preparing an F-POSS copolymer comprising
contacting an F-POSSMA monomer of the formula $$CH_2=CHR^1(C(O)O(CH_2)_n\text{F-POSS})$$

wherein $R^1$ is H or —$CH_3$, and n is an integer from 1 to 5 with and acrylate monomer of the formula I $$CH_2=CHR^{1a}(C(O)O(CH_2)_{n1}R^2) \quad (I)$$

wherein:
$R^{1a}$ is H or —$CH_3$;
$R^2$ is $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl, —$OR^3$, —NCO, —NCS, —SCN,
—$OC(O)R^3$, —$OC(O)NR^3R^{3'}$, —$OS(O)R^3$, —$OS(O)_2R^3$, —$SR^3$, —$SC(O)R^3$, —$S(O)R^3$, —$S(O)_2R^3$,
—$S(O)_2OR^3$, —$S(O)NR^3R^{3'}$, —$S(O)_2NR^3R^{3'}$, —$OS(O)NR^3R^{3'}$, —$OS(O)_2NR^3R^{3'}$, —$NR^3R^{3'}$, —$NR^3C(O)R^4$, —$NR^3C(O)OR^4$, —$NR^3C(O)NR^4R^{4'}$, —$NR^3S(O)R^4$, —$NR^3S(O)_2R^4$, —$NR^3S(O)NR^3R^{4'}$,
—$NR^3S(O)_2NR^4R^{4'}$, —$P(O)(OR^3)_2$, —$C(O)R^3$, —$C(O)OR^3$ or —$C(O)NR^3R^{3'}$; wherein each hydrogen atom in $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl is independently optionally substituted by halogen, $C_1$-$C_6$ alkyl, $C_2$-$C_6$ alkenyl, $C_2$-$C_6$ alkynyl, $C_3$-$C_6$ cycloalkyl, 3- to 7-membered heterocycloalkyl, $C_6$-$C_{10}$ aryl, 5- to 7-membered heteroaryl, —$OR^5$, —$OC(O)R^5$, —$OC(O)NR^5R^{5'}$, —$OS(O)R^5$, —$OS(O)_2R^5$, —$SR^5$, —$SC(O)R^5$, —$S(O)R^5$, —$S(O)_2R^5$, —$S(O)_2OR^5$, —$S(O)NR^5R^{5'}$, —$S(O)_2NR^5R^{5'}$, —$OS(O)NR^5R^{5'}$, —$OS(O)_2NR^5R^{5'}$, —$NR^5R^{5'}$, —$NR^5C(O)R^6$, —$NR^5C(O)OR^6$, —$NR^5C(O)NR^6R^{6'}$, —$NR^5S(O)R^6$, —$NR^5S(O)_2R^6$, —$NR^5S(O)NR^6R^{6'}$, —$NR^5S(O)_2NR^6R^{6'}$, —$P(O)(OR^5)_2$, —$C(O)R^5$, —$C(O)OR^5$, —$C(O)NR^5R^{5'}$, —$Si(R^5)_3$, —$Si(OR^5)_3$, —$Si(OR^5)_2R^6$ or —$Si(OR^5)(R^6)_2$;
$R^3$, $R^{3'}$, $R^4$ and $R^{4'}$ are each independently H, $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl, wherein each hydrogen atom in $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl is independently optionally substituted by halogen, $C_1$-$C_6$ alkyl, $C_2$-$C_6$ alkenyl, $C_2$-$C_6$ alkynyl, $C_3$-$C_6$ cycloalkyl, 3- to 7-membered heterocycloalkyl, $C_6$-$C_{10}$ aryl, 5- to 7-membered heteroaryl, —$OR^5$, —$OC(O)R^5$, —$OC(O)NR^5R^{5'}$, —$OS(O)R^5$, —$OS(O)_2R^5$, —$SR^5$, —$SC(O)R^5$, —$S(O)R^5$, —$S(O)_2R^5$, —$S(O)_2OR^5$, —$S(O)NR^5R^{5'}$, —$S(O)_2NR^5R^{5'}$, —$OS(O)NR^5R^{5'}$, —$OS(O)_2NR^5R^{5'}$, —$NR^5R^{5'}$, —$NR^5C(O)R^6$, —$NR^5C(O)OR^6$, —$NR^5C(O)NR^6R^{6'}$, —$NR^5S(O)R^6$, —$NR^5S(O)_2R^6$, —$NR^5S(O)NR^6R^{6'}$, —$NR^5S(O)_2NR^6R^{6'}$, —$P(O)(OR^5)_2$, —$C(O)R^5$, —$C(O)OR^5$, —$C(O)NR^5R^{5'}$, —$Si(R^5)_3$, —$Si(OR^5)_3$, —$Si(OR^5)_2R^6$ or —$Si(OR^5)(R^6)_2$;
each $R^5$, $R^{5'}$, $R^6$ and $R^{6'}$ is independently selected from the group consisting of H, $C_1$-$C_6$ alkyl, $C_2$-$C_6$ alkenyl, $C_2$-$C_6$ alkynyl, 3- to 7-membered heterocycloalkyl, $C_6$-$C_{10}$ aryl, 5- to 7-membered heteroaryl and $C_3$-$C_6$ cycloalkyl; and
n1 is an integer from 1 to 18;
and optionally and acrylate monomer of the formula II $$CH_2=CHR^{1c}(C(O)O(CH_2)_{n3}CH_3) \quad (II)$$

wherein $R^{1c}$ is H or —$CH_3$; and n3 is an integer from 0 to 5; in the presence of an initiator.

37. The process of clause 36, wherein the molar ratio of the acrylate monomer to the F-POSSMA monomer is from about 100:1 to about 800:1.

38. The process of clause 37, wherein the molar ratio of the acrylate monomers I and II to the F-POSSMA monomer is from about 40:1 to about 800:1.

39. The process of any one of clauses 36 to 38, wherein $R^{1a}$ is —$CH_3$.

40. The process of any one of clauses 36 to 39, wherein $R^2$ is —OH or —NCO.

41. The process of any one of clauses 36 to 40, wherein n1 is 2.

42. The process of any one of clauses 36 to 41, wherein $R^2$ is —NCO.

43. The process of any one of clauses 36 to 42, wherein $R^2$ is —OH.

44. The process of any one of clauses 36 to 43, wherein $R^{1a}$ is —$CH_3$.

45. The process of any one of clauses 36 to 44, wherein n3 is 2.

46. The process of any one of clauses 36 to 45, wherein the contacting is carried out in the presence of an initiator.

47. The process of any one of clauses 36 to 46, wherein the contacting is carried out in the presence of AIBN.

48. The process of any one of clauses 36 to 47, wherein the contacting is carried out in the presence of an organic solvent.

49. The process of any one of clauses 36 to 48, wherein the contacting is carried out in the presence of an organic solvent selected from the groups consisting of THF, ethyl ether, ethyl acetate, DMF, hexafluorobenzene, benzene, toluene, xylene, dichloromethane, hexanes, DMSO, and mixtures thereof.

50. The process of any one of clauses 36 to 49, wherein the contacting is carried out in the presence of a mixture of THF and hexafluorobenzene.

51. The process of any one of clauses 36 to 50, wherein the contacting is carried out at a temperature of from about 0° C. to about 90° C.

52. The process of any one of clauses 36 to 51, wherein the contacting is carried out at a temperature of from about 25° C. to about 70° C.

53. The process of any one of clauses 36 to 52, wherein the contacting is carried out under an inert atmosphere.

54. The process of any one of clauses 36 to 53, wherein the contacting is carried out under nitrogen.

EXAMPLES

The following examples describe methods of producing F-POSSMA derivatives. In the examples below, F-POSS methacrylic acid derivatives are disclosed. In all examples, MAA can be substituted with acrylic acid ($CH_2=CHCO_2H$). Additionally, substituted methacrylates can also be replaced with the corresponding substituted aerate.

Materials

F-POSSMA can be prepared according to known literature procedures, such as those described in U.S. patent Publication 2015/0065674. 2-Hydroxyethyl methacrylate (HEMA, Sigma Aldrich), hexafluorobenzene ($C_6F_6$, Sigma Aldrich), and anhydrous tetrahydrofuran (THF, Sigma Aldrich) were used without further purification. All reactions were performed in an inert atmosphere under nitrogen or argon. NMR's we obtained on an Agilent 500-MHz Spectrometer.

Example 1

F-POSSMA/HEMA Copolymer

General copolymerization procedure: In 25-mL reactor equipped with a magnetic stirring bar, F-POSSMA (0.30 g, 0.09 mmol), 2-hydroxyethyl methacrylate (HEMA, 2.70 g, 20.7 mmol), azobisisobutyronitrile (AIBN, 0.01 g, 6.09 mmol) were dissolved in a 4:1 mixture of 13 ml of hexafluorobenzene and anhydrous THF. The resulting solution was added to a reaction vial and sealed with a septa. The solution was degassed with nitrogen (15 min) and stirred in a 65° C. oil bath overnight. The reaction was quenched by cooling with ice water and washed off with hexanes. Polymer was precipitated, filtered, and dried under vacuum to yield a white solid (1.8 g, 60% yield).

$^1$H NMR. (($CD_3$)$_2$CO, 500 MHz): δ 0.13 (s, 3H), 0.84-0.89 (m, 4H), 0.95-1.12 (m, 16H), 1.27 (s, 3H), 1.29 (s, 3H), 1.9-2.1 (m, 16H), 2.33 (br, 1H), 3.63 (t, 2H), 3.74-3.91 (br, 2H), 4.08-4.20 (br, 2H)

$^{19}$F NMR (($CD_3$)$_2$CO, 376 MHz): δ−81.6, −116.8, −122.5, −123.3, −123.9, −126.8.

Example 2

Contact Angle Experiment for F-POSSMA/HEMA Copolymer

Contact angle measurement. Copolymer was dissolved in acetone and dip-coated on glass substrates. The glass substrates were dried in oven at 70° C. for two hours. 5 µl of water and hexadecane was introduced on the glass substrates. The results are shown in Table 1, and FIG. 1.

TABLE 1

|  | 1 | 2 | 3 | 4 | 5 | Mean |
| --- | --- | --- | --- | --- | --- | --- |
| Water | 108° | 105° | 110° | 110° | 98° | 106 ± 5° |
| Hexadecane | 70° | 69° | 70° | 66° | 68° | 69 ± 2° |

Example 3

F-POSSMA/Karenze MOI Copolymer

General copolymerization procedure: In a reactor equipped with a magnetic stirring bar, F-POSSMA (0.5 g, 0.15 mmol), isocyanatoethyl methacrylate (Karenze MOI, 4.5 g, 29.03 mmol), azobisisobutyronitrile (AIBN, 0.02 g, 12.18 mmol) were dissolved in a 4:1 mixture of 25 ml of hexafluorobenzene and anhydrous THF, and the reactor sealed with a septa. The solution was degassed with argon (20 min) and stirred under argon at 70° C. for 18 hrs. The polymer precipitated. Heat was removed and the reaction was cooled to ambient temperature, filtered, and washed 2× with 25 mL of 4:1 hexafluorobenzene and anhydrous THF. The solids were dried at 50° C. for 2 days under high vacuum to afford 4.2 g (80% yield). FTIR showed characteristic strong absorbance for isocyanate (2258 cm$^{-1}$) and ester (1723 cm$^{-1}$).

Example 4

F-POSSMA/Karenze MOI/MMA Terpolymer

General polymerization procedure for tripolymer containing 10% Karenz MOI, 10% FPOSS-MA, 80% MMA: A solution of anhydrous tetrahydrofuran (106.5 mL), hexafluorobenzene (426 mL), AIBN (600 mg), isocyanatoethyl methacrylate (9 g, 58 mmol) [Karenze MOI, Showa Denko], 6/2FPOSS-MA (9 g, 18 mmol), and methyl methacrylate (MMA, 72 g, 719.14 mmol) [Fisher-Acros Organics], was degassed with argon (30 min). The reaction vessel was sealed and the solution was heated to 80° C. under argon for 4 hrs. A white solid precipitated during the reaction. The reaction was cooled to ambient temperature. The supernatant liquid was carefully decanted into 2.5 L of hexanes. The resulting precipitate was collected, washed 3× with hexanes and dried at 50° C. under high vacuum overnight to afford 26.5 g (29% yield). The product was soluble in acetone and MEK. The FTIR (isocyanate, 2257.7 cm$^{-1}$ and ester, 1723 cm$^{-1}$) and $^{19}$F NMR (−81.83 ppm) were consistent for the desired product.

The invention claimed is:

1. An F-POSS copolymer, comprising the formula:

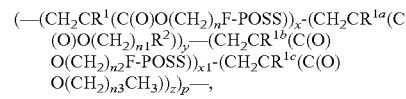

wherein

R$^1$, R$^{1a}$, R$^{1b}$ and R$^{1c}$ are each independently H or —$CH_3$;
R$^2$ is —OH or —NCO; and
n is an integer from 1 to 5;
n1 is an integer from 1 to 18;
n2 is an integer from 1 to 5;
n3 is an integer from 0 to 5;
p is an integer from 1 to about 10;
x is an integer from 1 to about 5;
x1 is an integer from 0 to about 3;
y is an integer from about 50 to about 1200; and
z is an integer from 0 to about 1000.

2. The F-POSS copolymer of claim 1, wherein n is 3.

3. The F-POSS copolymer of claim 2, wherein R$^1$ is —$CH_3$.

4. The F-POSS copolymer of claim 3, wherein R$^{1a}$ is —$CH_3$.

5. The F-POSS copolymer of claim 4, wherein n1 is 2.

6. The F-POSS copolymer of claim 5, wherein x1 is 0.

7. The F-POSS copolymer of claim 6, wherein z is 0.

8. The F-POSS copolymer of claim 7, wherein R$^2$ is —OH.

9. The F-POSS copolymer of claim 5, wherein R$^2$ is —NCO.

10. The F-POSS copolymer of claim 9, wherein z is an integer from about 50 to about 1000.

11. The F-POSS copolymer of claim 10, wherein x1 is an integer from 1 to about 3.

12. The F-POSS copolymer of claim 11, wherein $R^{1b}$ is —$CH_3$.

13. The F-POSS copolymer of claim 12, wherein n2 is 3.

14. The F-POSS copolymer of claim 13, wherein $R^{1c}$ is —$CH_3$.

15. The F-POSS copolymer of claim 14, wherein n3 is 0.

16. A copolymer produced by a process, comprising:
copolymerizing an F-POSSMA monomer of the formula $$CH_2=CR^1(C(O)O(CH_2)_n\text{F-POSS})$$

wherein $R^1$ is H or —$CH_3$, and n is an integer from 1 to 5, with an acrylate monomer of the formula I $$CH_2=CR^{1a}(C(O)O(CH_2)_{n1}R^2) \quad (I)$$

wherein
$R^{1a}$ is H or —$CH_3$;
$R^2$ is —OH or —NCO;
and
n1 is an integer from 1 to 18;
and optionally an acrylate monomer of the formula II $$CH_2=CR^{1c}(C(O)O(CH_2)_{n3}CH_3) \quad (II)$$

wherein $R^{1c}$ is H or —$CH_3$; and n3 is an integer from 0 to 5.

17. The copolymer of claim 16, wherein the molar ratio of the acrylate monomer to the F-POSSMA monomer is from about 100:1 to about 800:1.

18. The copolymer of claim 16, wherein the molar ratio of the acrylate monomers I and II to the F-POSSMA monomer is from about 40:1 to about 800:1.

19. A process for preparing an F-POSS copolymer, comprising:
contacting an F-POSS MA monomer of the formula $$CH_2=CR^1(C(O)O(CH_2)_n\text{F-POSS})$$

wherein $R^1$ is H or —$CH_3$, and n is an integer from 1 to 5, with and acrylate monomer of the formula I $$CH_2=CR^{1a}(C(O)O(CH_2)_{n1}R^2) \quad (I)$$

wherein
$R^{1a}$ is H or —$CH_3$;
$R^2$ is —OH or —NCO;
and
n1 is an integer from 1 to 18;
and optionally and acrylate monomer of the formula II $$CH_2=CR^{1c}(C(O)O(CH_2)_{n3}CH_3) \quad (II)$$

wherein $R^{1c}$ is H or —$CH_3$, and n3 is an integer from 0 to 5; in the presence of an initiator.

* * * * *